Figure 3:
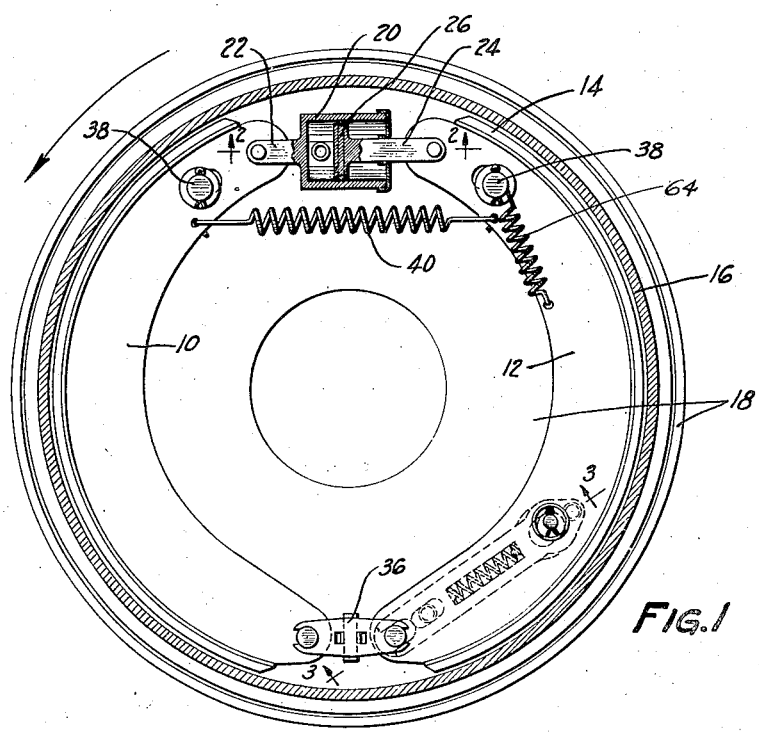

Nov. 17, 1936.  C. H. TAYLOR  2,060,909

BRAKE

Filed Oct. 17, 1930

INVENTOR
CECIL H. TAYLOR
BY
ATTORNEY

Patented Nov. 17, 1936

2,060,909

UNITED STATES PATENT OFFICE 2,060,909

BRAKE

Cecil H. Taylor, South Bend, Ind., assignor to Bendix Brake Company, South Bend, Ind., a corporation of Illinois Application October 17, 1930, Serial No. 489,265

4 Claims. (Cl. 188—78)

This invention relates to brakes in general and more particularly to an automotive brake of the hydraulic internal expanding type adaptable for the front wheels of a four wheel braking system.

Hydraulic brakes, so called, generally employ a fluid motor to actuate the conventional brake parts of an internal expanding brake assembly. With such an applying means there is inherently the susceptibility of power loss inasmuch as the liquid under pressure within the motor may leak at the various joints, pistons, etc. It is accordingly an object of the invention to reduce the number of motor parts to a minimum thereby reducing the possibility of leakage and automatically increasing the efficiency of the motor.

A further object of the invention lies in the provision of a compact floating motor, the elements thereof to be readily positioned between the friction means of the brake, the cylinder element of the motor to be pivotally secured to one of adjacent spaced apart ends of the friction means and the piston element to be pivotally secured to the remaining end. With such applying means I have inherently balanced forces acting on the ends of the friction means.

Yet another object of the invention is to provide means for automatically centralizing or positioning the elements of the brake when in "brake off" position. To that end, there are provided three juxtaposed parts, two of said parts being secured to an adjusting member on a fixed support for the brake and the third part secured to a part of the movable brake, relative motion of certain of the parts being yieldingly resisted by a spring loading means.

Figure 2:
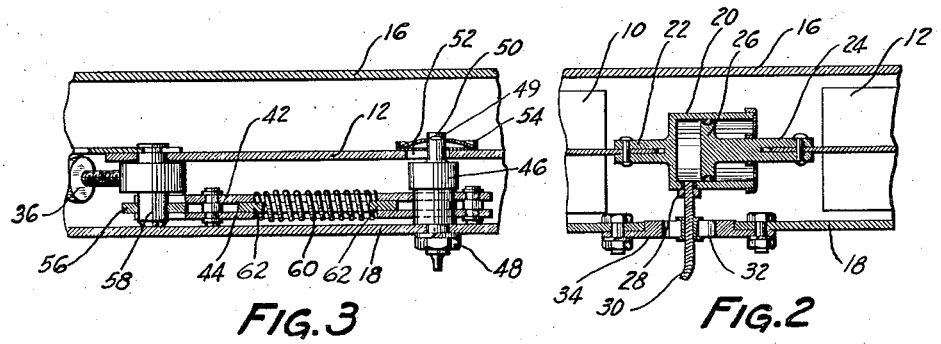

Other objects and features of the invention will become apparent from the following detailed description taken in conjunction with the drawing, in which:

Figure 1 is a section taken just inside the head of the brake drum, disclosing the elements of the brake in side elevation, Figure 2 is a section taken on line 2—2 of Figure 1, disclosing in section the relatively movable parts of the fluid motor, and Figure 3 is a sectional view through the centering mechanism shown in Figure 1.

As disclosed in Figure 1, the brake comprises similar interchangeable brake shoe elements 10 and 12 provided with the conventional brake lining 14 engageable with the usual rotatable brake drum 16. The entire brake assembly is housed within and supported by the conventional braking or support plate 18.

According to an important feature of the invention, the expanding or operating means for the brake shoe elements comprise a fluid motor positioned between spaced apart ends of the shoe elements. This motor preferably comprises a cylindrical body portion 20 provided with a shank 22 pivotally secured at its outer bifurcated end to the web portion of the brake shoe 10. The connecting rod 24 of the piston 26 is also pivoted at its outer end to the adjacent end of the remaining brake shoe 12. The force transmitting operating fluid is preferably admitted to the cylinder forward of the piston by a coupling 28, the fluid being housed by a conventional flexible tube 30 passing through a slot 32 in a closure plate 34 rigidly secured to the braking plate 18.

In order to compensate for lining wear, the over-all length of the friction elements may be increased by an adjustable articulating joint 36, forming no part of this invention. Anchor pins 38 are preferably rigidly secured to the backing plate adjacent the fluid motor, which anchor pins pass through slotted openings in the webs of the brake shoes to permit relative motion of these parts. A return spring 40 secured to the webs of the two shoes serves to draw the same into engagement with the anchor pins in "brake off" position and also serves to return the fluid motor parts to their inoperative state.

A spring 64 secured to the anchor pin 38 and to the shoe 12 normally urges that shoe in a counter-clockwise direction so that in the released position, the shoe contacts with the anchor 38. Thus when the brake is applied while the wheel is rotating in a forward or counter-clockwise direction (as shown by the arrow), the objectionable click which might be caused by the contact of the shoe 12 with the anchor 38 is eliminated.

It is also desirable to position the elements of the brake within the brake drum to clear the revolving drum when in "brake off" position. With this object in view, there is suggested a novel centering mechanism preferably comprising three juxtaposed stampings disclosed in detail in Figure 3. The outermost stampings 42 and 44 are preferably recessed at adjacent ends, which recesses receive an eccentric 46 mounted on the backing plate 18 and adjustably secured thereto in fixed position by a nut 48. The eccentric 46 may also be provided on its end with a reduced extension 49 extending through a slot 52 in the shoe web. A pin 50 (which may be a cotter pin if desired) is inserted through the end of the reduced extension 49. Thus, the pin 50 and extension 49 together with a washer 54 serve to laterally position the shoe. As may be seen, the washer 54 encircles the extension 48 and is held on the extension by means of the pin 50. The intermediate stamping 56 may be provided at its end remote from the eccentric 46 with an opening to receive a pin 58 which latter member forms a part of the adjustable articulating joint 36. The outer stampings 42 and 44 are also preferably slotted at their lower ends to receive the pin 58 and the intermediate stamping is likewise slotted to receive the eccentric 46. This latter structure insures stability of the parts. The three stampings are adapted to function as a centering mechanism by virtue of an initially compressed spring 60 housed within aligned slots in the central portions of the stampings as clearly disclosed in Figure 3. This spring projects beyond the sides of the outermost stampings and is also retained in position by projections 62 extending from the innermost stamping 56.

With pressure applied to the fluid medium by any suitable appliance, which may be, if desired, a master cylinder on the car chassis, the motor parts of Figure 1 are placed under pressure, one or the other of said parts moving laterally to bring its brake shoe into engagement with the rotating drum. That part of the motor will move which gives least resistance to the pressure of the actuating fluid. Once into drum contact, the motor part which has first moved will serve as an abutment and thereafter continued fluid pressure from the master cylinder will function to actuate the remaining motor part to thereby move the remaining brake shoe into drum contact.

Both during the applying phase, that is, while the lining clearance is being taken up and during the braking phase, that is, after both shoes are in drum contact, I have equal forces transmitted to the respective ends of the shoes; this, by virtue of the inherent force transmitting function of the fluid medium.

It is desired however, that the secondary shoe in forward braking, namely, brake shoe 12, shall offer the greatest resistance to motion of the two shoes in the left front brake shown in Figure 1 and with the drum rotating counterclockwise I have a condition whereby the secondary shoe 12 will remain anchored and the primary shoe will be first applied to the brake drum. This will obviate the click which would otherwise ensue if the secondary shoe were to leave the anchor during the applying of the brake and subsequently be forced into engagement therewith under the combined effect of the applying means and the rotating drum. The additional load imposed upon shoe 12 may be obtained by a return spring 64 secured to an anchor pin and to the web of the shoe.

As the shoes are forced into drum contact, plates 42 and 44 will move relative to plate 56 further compressing spring 60 and upon release of the brake the spring 60 will return the shoes to a position clear of the drum. From time to time the eccentric 46 may be rotated to alter this position to compensate for the wear of the parts.

The hydraulic brake arrangement disclosed is also shown and is claimed in my copending divisional application Serial No. 41,125, filed September 18, 1935.

While I have illustrated and described somewhat in detail one embodiment of my invention, it is not my intention to limit the scope of the invention to this particular embodiment or otherwise than by the terms of the appended claims.

I claim:

1. A brake mechanism comprising, in combination, a brake support plate, an adjusting member secured to said plate, friction elements mounted on said plate, positioning mechanism for said elements comprising a plurality of juxtaposed orificed plates, the outermost of said plates being pivotally mounted on said adjusting member, an intermediate plate pivotally mounted on one of said friction elements, and spring means positioned in said openings in the plates.

2. A brake mechanism comprising in combination, a brake support plate, friction elements mounted on said plate, positioning mechanism for said elements comprising a plurality of juxtaposed orificed plates, the outermost of said plates being pivotally mounted on said support plate, and an intermediate plate being pivotally mounted on one of said friction elements, and spring means positioned in said orifices in the plates.

3. A brake mechanism comprising in combination a backing plate, an adjusting member secured to said plate, friction shoes mounted on said plate, a pivotal connection for said shoes including a pair of pins, and positioning mechanism for said shoes comprising a plurality of elements, one of said elements being pivotally mounted on one of the pins of said pivotal connection, another element being pivotally mounted on said adjusting member, and spring means positioned between said elements.

4. A brake mechanism comprising a pair of friction shoes, an adjustable pivotal connection for said shoes comprising an arrangement connected to both of said shoes by pivotal joints, a backing plate for said shoes, and means for positioning said shoes in brake-off position including a compressible member having one of its ends mounted on one of the pivotal joints and having its other end mounted on said support plate.

CECIL H. TAYLOR.